(12) United States Patent
Yanagihashi et al.

(10) Patent No.: US 11,620,607 B2
(45) Date of Patent: Apr. 4, 2023

(54) DELIVERY SYSTEM, DELIVERY METHOD AND PROGRAM

(71) Applicant: TOYOTA JIDOSHA KABUSHIKI KAISHA, Toyota (JP)

(72) Inventors: Takaaki Yanagihashi, Toyota (JP); Takahiro Okano, Chiryu (JP); Toru Takashima, Susono (JP); Hiroaki Kiyokami, Nisshin (JP); Kenta Miyahara, Okazaki (JP); Yohei Tanigawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/519,095

(22) Filed: Nov. 4, 2021

(65) Prior Publication Data
US 2022/0147918 A1    May 12, 2022

(30) Foreign Application Priority Data

Nov. 6, 2020  (JP) .............................. JP2020-185809

(51) Int. Cl.
G06Q 10/0832 (2023.01)
B65G 65/00 (2006.01)
(Continued)

(52) U.S. Cl.
CPC ......... G06Q 10/0832 (2013.01); B65G 15/00 (2013.01); B65G 65/00 (2013.01); G06Q 10/08355 (2013.01)

(58) Field of Classification Search
CPC ......... G06Q 10/0832; G06Q 10/08355; G06Q 10/083
See application file for complete search history.

(56) References Cited

U.S. PATENT DOCUMENTS 5,720,363 A * 2/1998 Kipp ................. B61L 27/04
                                          235/383
9,505,559 B1 * 11/2016 Cai ..................... B65G 47/506
(Continued)

FOREIGN PATENT DOCUMENTS

JP    2020-004181 A    1/2020

OTHER PUBLICATIONS

Langley, "Magway: Is this underground tunnel network the future of delivery services?," Feb. 10, 2020, Evening Standard, retrieved from https://www.standard.co.uk/futurelondon/cleanair/magway-underground-tunnels-delivery-courier-a4309971.html (Year: 2020).*

*Primary Examiner* — Rupangini Singh
*Assistant Examiner* — Bryan J Kirk
(74) *Attorney, Agent, or Firm* — Dinsmore & Shohl LLP

(57) ABSTRACT

A delivery system includes a moving apparatus on which a parcel to be transferred to a predetermined region is loaded and that is capable of moving the parcel along a circulation route along which the moving apparatus circulates in the region. The delivery system acquires delivery information including position information about a delivery destination of the parcel, generates a delivery plan for delivering the parcel to the delivery destination, based on the acquired delivery information, and controls the moving apparatus such that the moving apparatus moves the parcel to the delivery destination on the circulation route based on the delivery plan and fulfills the transfer of the parcel when permission information indicating that the transfer of the parcel is permitted has been received.

8 Claims, 13 Drawing Sheets

(51) Int. Cl.
 B65G 15/00 (2006.01)
 G06Q 10/0835 (2023.01)

(56) References Cited

U.S. PATENT DOCUMENTS

| | | | |
|---|---|---|---|
| 11,107,029 B1* | 8/2021 | Henry | H04L 67/34 |
| 2010/0094451 A1* | 4/2010 | Hoganson | B65G 51/44 |
| | | | 700/228 |
| 2019/0164113 A1* | 5/2019 | Fosgard | G01S 17/02 |
| 2020/0005240 A1 | 1/2020 | Ko et al. | |
| 2020/0231185 A1* | 7/2020 | Shiu | G06Q 50/32 |

* cited by examiner

FIG. 7

| PARCEL ID | DELIVERY DESTINATION POSITION INFORMATION | SCHEDULED TRANSFER HOUR | SCHEDULED SHIPMENT HOUR | ADDRESSEE ID |
|---|---|---|---|---|
| a a a a | x x x x | 6:00-9:00 | 10:00-12:00 | ○○○ |
| b b b b | y y y y | 9:00-12:00 | 15:00-18:00 | x x x |
| .... | .... | .... | .... | .... |

FIG. 8A

| DATE | HOUR | CIRCULATION ROUTE | FIRST WAITING ROUTE | .... |
|---|---|---|---|---|
| 10/17 | 9:00-12:00 | 30% | 0% | .... |
| | 12:00-15:00 | 40% | 0% | .... |
| | .... | .... | .... | .... |

FIG. 8B

| DATE | HOUR | CIRCULATION ROUTE | FIRST WAITING ROUTE | .... |
|---|---|---|---|---|
| 12/25 | 9:00-12:00 | 40% | 0% | .... |
| | 12:00-15:00 | 80% | 10% | .... |
| | .... | .... | .... | .... |

FIG. 9A

| DATE | HOUR | DELIVERY STATE | DELIVERY DESTINATION INLET | WAITING ROUTE INLET | WAITING ROUTE OUTLET |
|---|---|---|---|---|---|
| 10/17 | 9:00-12:00 | WAITING | NOT PERMITTED | NOT PERMITTED | NOT PERMITTED |
| | 12:00-15:00 | TRANSFER | PERMITTED | NOT PERMITTED | NOT PERMITTED |

FIG. 9B

| DATE | HOUR | DELIVERY STATE | DELIVERY DESTINATION INLET | WAITING ROUTE INLET | WAITING ROUTE OUTLET |
|---|---|---|---|---|---|
| 12/25 | 9:00-12:00 | WAITING | NOT PERMITTED | PERMITTED | NOT PERMITTED |
| | 12:00-15:00 | TRANSFER | PERMITTED | NOT PERMITTED | PERMITTED |

DELIVERY SYSTEM, DELIVERY METHOD AND PROGRAM

CROSS-REFERENCE TO RELATED APPLICATION

This application claims priority to Japanese Patent Application No. 2020-185809 filed on Nov. 6, 2020, incorporated herein by reference in its entirety.

BACKGROUND

1. Technical Field

The disclosure relates to a delivery system, a delivery method and a program for delivering a parcel using a moving apparatus.

2. Description of Related Art

Japanese Unexamined Patent Application Publication No. 2020-004181 (JP 2020-004181 A) discloses a delivery system in which a parcel to be delivered to a predetermined area is collected to a distribution station (relay spot) and the delivery of the parcel is turned over in the distribution station by a driver that takes charge of the area.

SUMMARY

However, in the delivery system described in JP 2020-004181 A, there is a problem in that when a large number of parcels are collected in a busy period or the like, it is difficult to store the parcels in one distribution station because of lack of a storage space. Further, when an addressee is absent at a delivery destination, the driver repeatedly moves between the distribution station and the delivery destination in some cases, resulting in problems of decrease in delivery efficiency and increase in personnel cost.

The disclosure has been made in consideration of the above problems, and has an object to provide a delivery system in which it is easy to store the parcel before the parcel is transferred to the delivery destination and a delivery business operator does not need to repeatedly move between the distribution station and the delivery destination even when the addressee is absent at the delivery destination.

A delivery system described in claim 1 includes a moving apparatus, an acquisition unit, a delivery plan generation unit and a delivery control unit, the moving apparatus being configured to have a parcel loaded and to be capable of moving the parcel along a circulation route, the parcel being transferred to a predetermined region, the circulation route being a route along which the moving apparatus moves in the region, the acquisition unit being configured to be capable of acquiring delivery information including position information about a delivery destination of the parcel, the delivery plan generation unit being configured to be capable of generating a delivery plan based on the acquired delivery information, the delivery plan being a plan for delivering the parcel to the delivery destination, and the delivery control unit controls the moving apparatus such that the moving apparatus moves the parcel to the delivery destination on the circulation route based on the delivery plan and fulfills the transfer of the parcel when permission information has been received, the permission information indicating that the transfer of the parcel is permitted.

The delivery system described in claim 1 includes the moving apparatus on which the parcel to be transferred to the predetermined region is loaded and that is capable of moving the parcel along the circulation route along which the moving apparatus circulates in the region. The parcel is moved to the delivery destination on the circulation route by the moving apparatus, based on the delivery plan. When the permission information indicating that the transfer of the parcel is permitted has been received, the moving apparatus fulfills the transfer of the parcel to the delivery destination. Accordingly, for example, when the permission information has not been received because the addressee of the parcel is absent, the parcel for which the addressee is absent is moved along the circulation route while being loaded on the moving apparatus. Thereby, it is easy to store the parcel before the parcel is transferred to the delivery destination, and the delivery business operator does not need to repeatedly move between a distribution station and the delivery destination even when the addressee is absent at the delivery destination.

In a delivery system described in claim 2, in the configuration described in claim 1, the acquisition unit may be configured to be capable of acquiring the delivery information by reading an identification code attached to the parcel.

With the delivery system described in claim 2, it is possible to read the delivery information including the position information about the delivery destination, from the identification code attached to the parcel. Accordingly, for example, by previously attaching the identification code to the parcel in a central distribution station that controls a broad area including a plurality of predetermined regions, it is possible to transmit the delivery information between the central distribution station and the moving apparatus, without communication.

In a delivery system described in claim 3, in the configuration described in claim 1 or 2, when the permission information has not been received while the moving apparatus is moving the parcel to the delivery destination, the delivery control unit may control the moving apparatus such that the moving apparatus moves the parcel to the delivery destination and temporarily places the parcel at a temporary placement site provided at the delivery destination.

With the delivery system described in claim 3, for example, when the permission information about the transfer has not been received because the addressee of the parcel is absent, it is possible to move the parcel for which the addressee is absent, to the temporary placement site provided at the delivery destination. Accordingly, it is possible to reduce a situation where the amount of the parcels on the moving apparatus is close to an acceptable load amount because the parcel for which the addressee is absent is moved while being loaded on the moving apparatus.

In a delivery system described in claim 4, in the delivery system described in any one of claims 1 to 3, when the permission information has not been received while the moving apparatus is moving the parcel to the delivery destination, the delivery control unit may control the moving apparatus such that the moving apparatus moves the parcel along a waiting route branching from the circulation route.

With the delivery system described in claim 4, for example, when the permission information has not been received because the addressee of the parcel is absent, it is possible to move the parcel for which the addressee is absent, along the waiting route branching from the circulation route. Accordingly, it is possible to reduce the situation where the amount of the parcels on the moving apparatus is close to the acceptable load amount because the parcel for which the addressee is absent is moved while being loaded on the moving apparatus.

A delivery system described in claim 5, in the delivery system described in any one of claims 1 to 4, may further include a congestion level prediction unit that predicts a congestion level of the circulation route at a predetermined hour based on the delivery information, in which the delivery plan generation unit may be configured to be capable of generating the delivery plan so as to avoid the congestion level from being equal to or higher than a predetermined threshold value, based on the predicted congestion level.

With the delivery system described in claim 5, it is possible to deliver the parcel while maintaining a state where the congestion level of the circulation route is lower than the predetermined threshold value. Thereby, even when a large number of parcels are delivered in a busy period of the delivery business operator or the like, it is possible to efficiently deliver the parcels while avoiding the situation where the amount of the parcels on the moving apparatus is close to the acceptable load amount.

In a delivery system described in claim 6, in the delivery system described in any one of claims 1 to 5, the moving apparatus may be constituted by a belt conveyor apparatus in which a conveyance path is formed along the circulation route.

With the delivery system described in claim 6, it is possible to load a picked-up parcel on the conveyance path of the belt conveyor apparatus, and to transfer the parcel to the delivery destination. Thereby, it is easy to store the parcel before the parcel is transferred to the delivery destination, and the delivery business operator does not need to repeatedly move between the distribution station and the delivery destination even when the addressee is absent at the delivery destination.

In a delivery system described in claim 7, in the delivery system described in claim 6, the belt conveyor apparatus may be provided underground, and when the permission information has been received while the moving apparatus is moving the parcel to the delivery destination, the delivery control unit may control the moving apparatus such that the moving apparatus moves the parcel to the delivery destination, puts the parcel in an elevator apparatus underground of the delivery destination, and transfers the parcel to a home delivery box provided on an aboveground floor, using the elevator apparatus.

With the delivery system described in claim 7, since the belt conveyor apparatus is provided underground, it is possible to build a delivery network without being subject to restrictions of ground facilities. Further, for example, when the permission information about the transfer has been received from the addressee of the parcel, it is possible to smoothly receive the parcel by transferring the parcel from the underground conveyance path to the aboveground home delivery box using the elevator apparatus.

In a delivery system described in claim 8, in the delivery system described in any one of claims 1 to 5, the moving apparatus may be constituted by an automatic driving vehicle capable of automatically traveling along the circulation route.

With the delivery system according to claim 8, it is possible to load a picked-up parcel on the automatic driving vehicle that travels along the circulation route, and to transfer the parcel to the delivery destination. Thereby, it is easy to store the parcel before the parcel is transferred to the delivery destination, and the delivery business operator does not need to repeatedly move between the distribution station and the delivery destination even when the addressee is absent at the delivery destination.

A delivery method described in claim 9 is a delivery method for transferring a parcel to a delivery destination using a moving apparatus, the moving apparatus being configured to have the parcel loaded and to be capable of moving the parcel along a circulation route, the parcel being transferred to a predetermined region, the circulation route being a route along which the moving apparatus moves in the region, the delivery method including: acquiring delivery information including position information about the delivery destination of the parcel; generating a delivery plan based on the acquired delivery information, the delivery plan being a plan for delivering the parcel to the delivery destination; and controlling the moving apparatus such that the moving apparatus moves the parcel to the delivery destination on the circulation route based on the delivery plan and fulfills the delivery of the parcel when permission information has been received, the permission information indicating that the transfer of the parcel is permitted.

With the delivery method described in claim 9, as described above, it is easy to store the parcel before the parcel is transferred to the delivery destination, and the delivery business operator does not need to repeatedly move between the distribution station and the delivery destination even when the addressee is absent at the delivery destination.

A program described in claim 10 is a program that causes a computer to execute a process for transferring a parcel to a delivery destination using a moving apparatus, the moving apparatus being configured to have the parcel loaded and to be capable of moving the parcel along a circulation route, the parcel being transferred to a predetermined region, the circulation route being a route along which the moving apparatus moves in the region, the process including:

acquiring delivery information including position information about the delivery destination of the parcel;

generating a delivery plan based on the acquired delivery information, the delivery plan being a plan for delivering the parcel to the delivery destination; and controlling the moving apparatus such that the moving apparatus moves the parcel to the delivery destination on the circulation route based on the delivery plan and fulfills the delivery of the parcel when permission information has been received, the permission information indicating that the transfer of the parcel is permitted.

With the program described in claim 10, as described above, it is easy to store the parcel before the parcel is transferred to the delivery destination, and the delivery business operator does not need to repeatedly move between the distribution station and the delivery destination even when the addressee is absent at the delivery destination.

With the disclosure, it is easy to store the parcel before the parcel is transferred to the delivery destination, and the delivery business operator does not need to repeatedly move between the distribution station and the delivery destination even when the addressee is absent at the delivery destination.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram showing an example of a table of a delivery information database;

FIG. 8A is a diagram showing an example of a table of a congestion level database;

FIG. 8B is a diagram showing an example of the table of the congestion level database;

FIG. 9A is a diagram showing an example of a table of a delivery plan database;

FIG. 9B is a diagram showing an example of the table of the delivery plan database;

DETAILED DESCRIPTION OF EMBODIMENTS

First Embodiment

Figure 1:
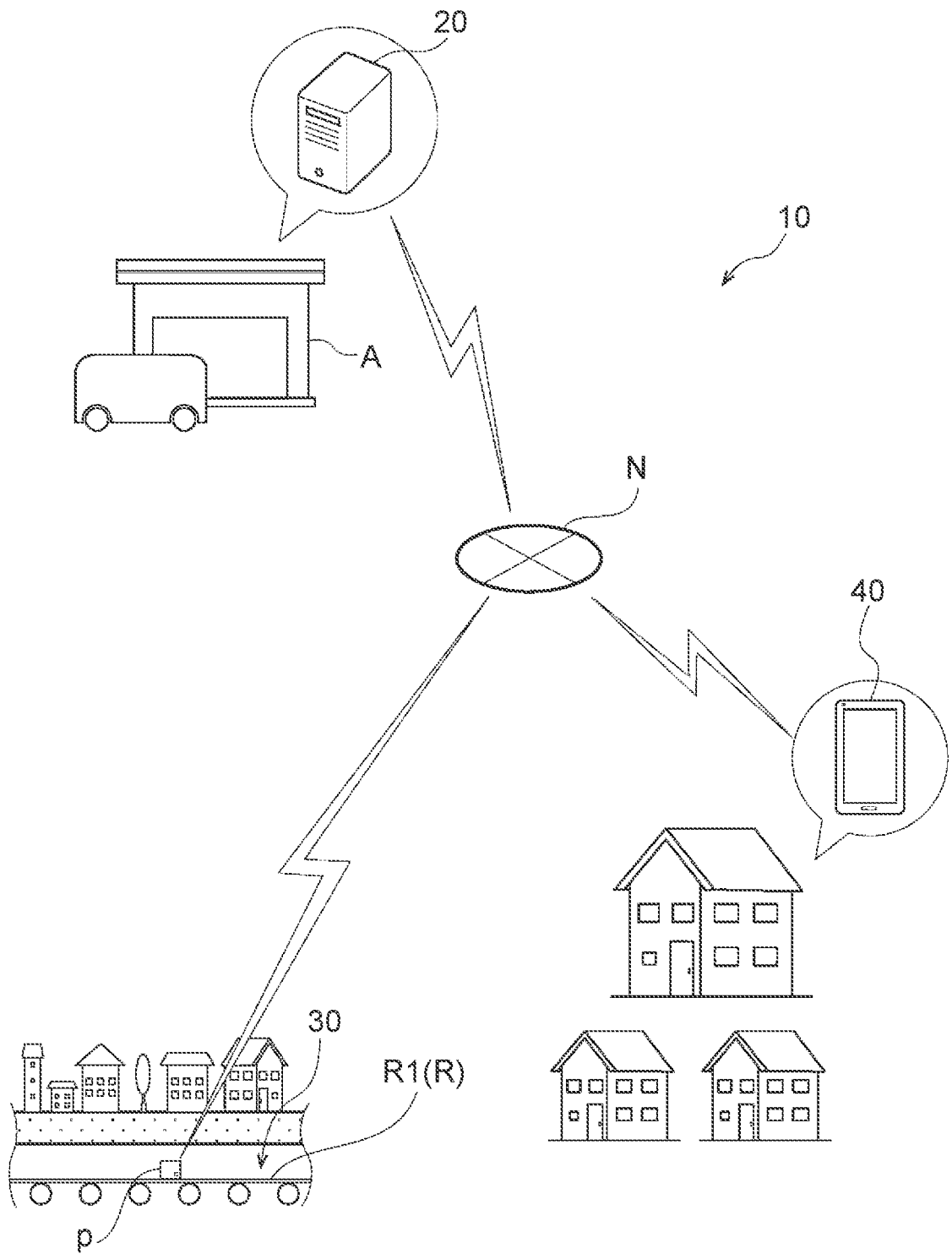
FIG. 1 is a diagram showing the schematic configuration of a delivery system according to a first embodiment.

A delivery system according to an embodiment of the disclosure will be described below with reference to the drawings. FIG. 1 is a block diagram showing the schematic configuration of a delivery system 10 according to a first embodiment.

Outline

As shown in FIG. 1, the delivery system 10 includes a delivery processing device 20, a moving apparatus 30 and a user terminal 40. The delivery processing device 20, the moving apparatus 30 and the user terminal 40 are configured to be capable of communicating with each other through a network N. The delivery system 10 provides a service in which a parcel P is loaded on the moving apparatus 30, the parcel P is moved along a circulation route R1 along which the moving apparatus 30 circulates in a predetermined region, and the parcel is transferred to a delivery destination on the circulation route R1.

For example, the delivery processing device 20 is disposed in a distribution center A that is a relay spot on a delivery route of a delivery business operator. The delivery processing device 20 manages the delivery of the parcel P collected in the distribution center A.

The parcel P collected in the distribution center A is loaded on the moving apparatus 30 by a worker of the distribution center A, and is transferred to the delivery destination by the moving apparatus 30. The moving apparatus 30 in the embodiment is constituted by a belt conveyor apparatus. In the embodiment, the moving apparatus 30 is provided underground in the predetermined region, and includes a conveyance path R that is constructed over the whole range of the region. The predetermined region is a transfer region for the distribution center A, for example. The conveyance path R has a circulation route R1 that is constructed such that the moving apparatus 30 circulates in the transfer region.

Figure 2A:
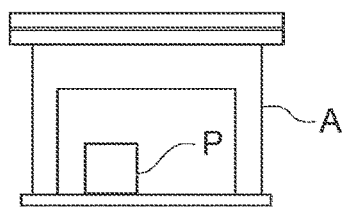
FIG. 2A is a diagram for describing a flow along which a parcel is delivered in the first embodiment.
Figure 2B:
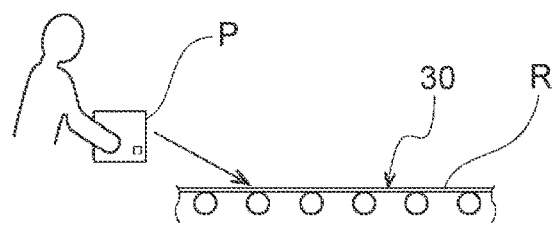
FIG. 2B is a diagram for describing the flow along which the parcel is delivered in the first embodiment.

As an example, a flow along which a product purchased in the internet or the like by a particular user is transferred to a user's home C will be described. As shown in FIG. 2A, the parcel P in which the product purchased by the user is packed is collected to the distribution center A via a broad-area distribution spot of the delivery business operator. The parcel P is loaded on the conveyance path R of the moving apparatus 30 by the worker of the distribution center A (see FIG. 2B), and is moved along the circulation route R1 toward the delivery destination (see FIG. 2C). Then, the parcel P is moved to a transfer spot D located underground of the home C that is the delivery destination, and is put in an elevator apparatus 42 from a carry-in hatch 44. The elevator apparatus 42 is directly connected to a home delivery box 46 installed on an aboveground floor of the home C, and can hand over the parcel to the user on the aboveground floor from the home delivery box 46 (see FIG. 2D).

Figure 3:
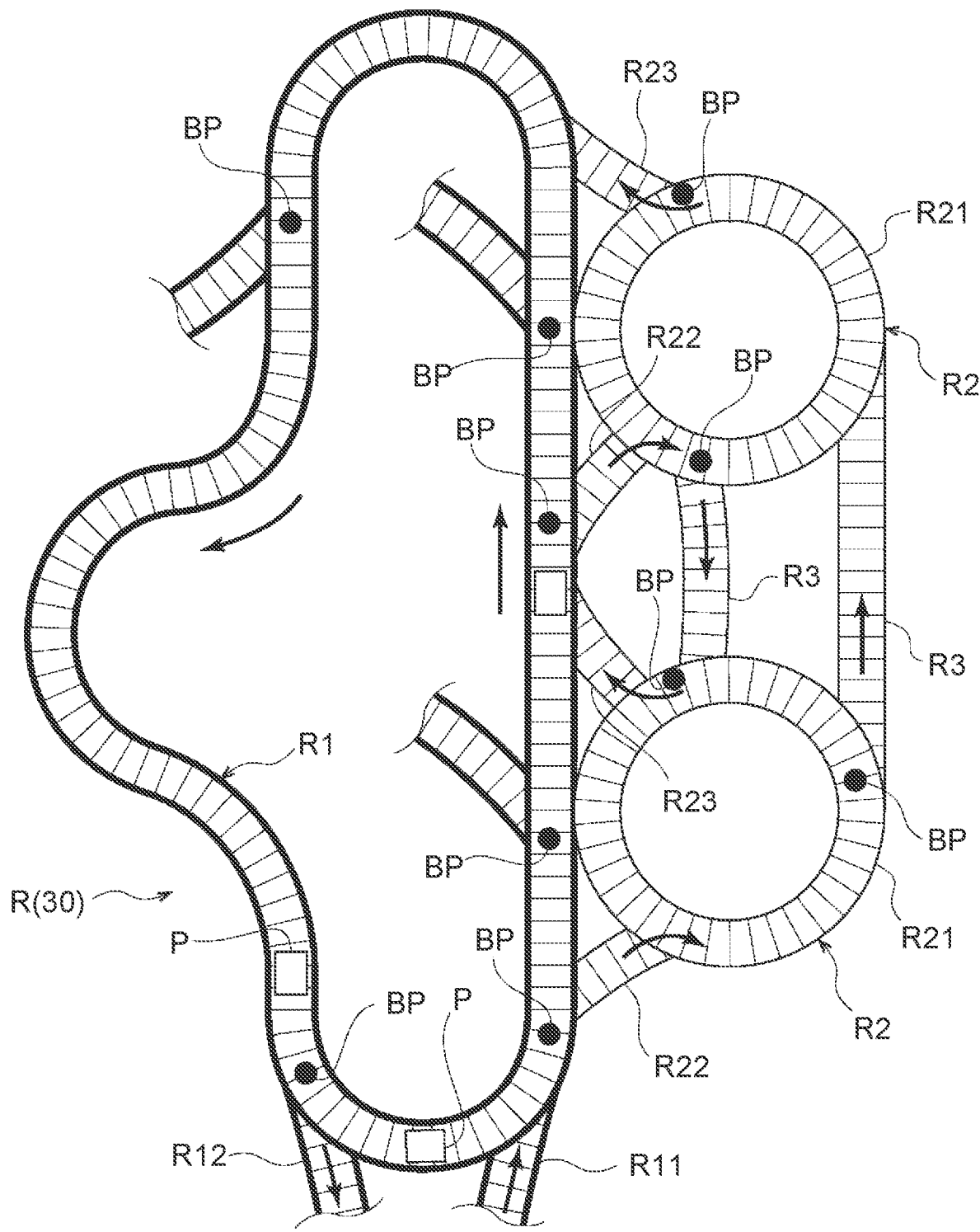
FIG. 3 is a schematic diagram for describing the structure of a belt conveyor apparatus that is a moving apparatus in the first embodiment.

FIG. 3 is a schematic diagram showing the conveyance path R of the moving apparatus 30. The conveyance path R includes the circulation route R1, a waiting route R2 and a junction route R3. The circulation route R1 is constructed such that the moving apparatus 30 circulates in the predetermined region. On the circulation route R1, an inlet R11 and an outlet R12 are provided, and the inlet R11 and the outlet R12 each reach the distribution center A. The parcel P loaded on the circulation route R1 can move over the whole range of the region along the circulation route R1.

The waiting route R2 is a conveyance path that is provided so as to branch from the circulation route R1, and includes a circular portion R21, a carry-in portion R22 and a carry-out portion R23. The circular portion R21 is constituted by a conveyance path having a circular shape. The carry-in portion R22 is a conveyance path that joins the circulation route R1 and the circular portion R21, and can carry the parcel P moving on the circulation route R1, in the circular portion R21. The carry-out portion R23 is a conveyance path that joins the circulation route R1 and the circular portion R21, and can carry the parcel P moving on the circular portion R21, to the circulation route R1. In the embodiment, two waiting routes R2 are provided along the circulation route R1. However, the number of waiting routes R2 may be one or three, and may be appropriately set as necessary. In the case where it is determined that it is necessary to evacuate the parcel P from the circulation route R1 by processes described later, the waiting route R2 is used as a route along which the parcel P temporarily circulates.

The junction route R3 is, when there is a plurality of waiting routes R2 as in the case of the embodiment, a conveyance path that joins the waiting routes R2. The junction route R3 can convey the parcel P between the waiting routes R2.

Figure 5:
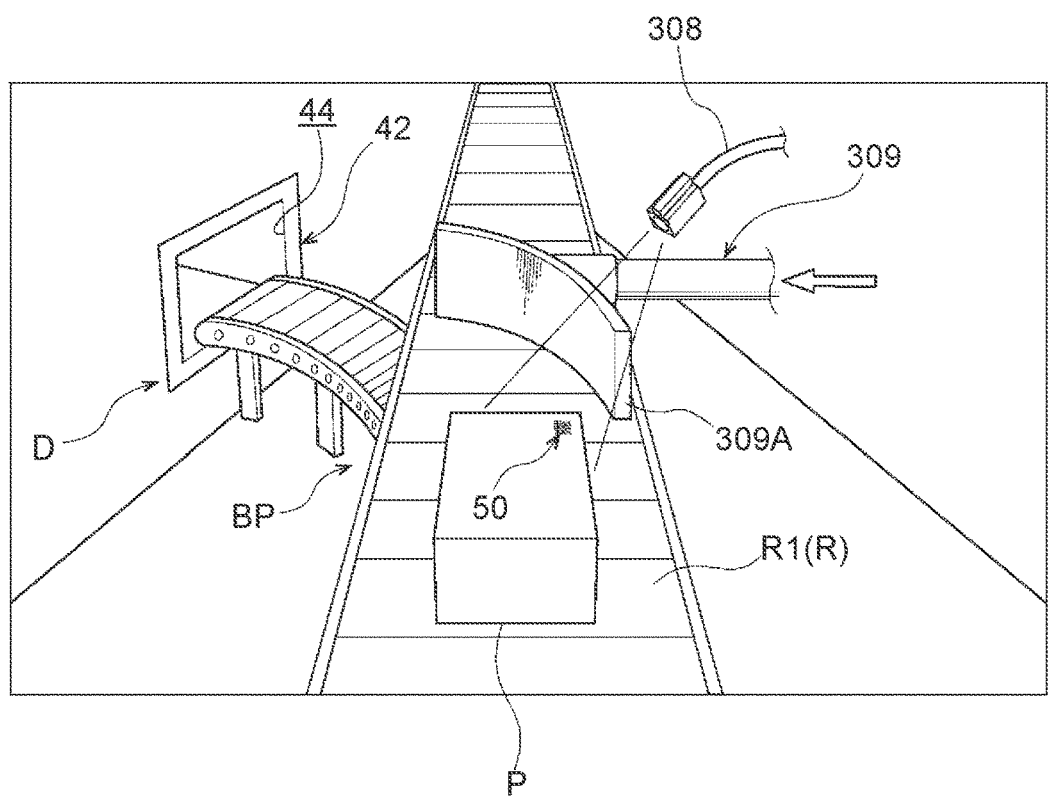
FIG. 5 is a schematic diagram showing an example of a state where the parcel moves on a conveyance path of the belt conveyor apparatus.

On the conveyance path R, a plurality of branch points BP reaching the delivery destination or the waiting route R2 is provided along the circulation route R1. The parcel P is guided in a movement direction by a conveyance arm 309 (see FIG. 5) disposed at a branch point BP, and thereby, can move to a delivery destination or waiting route R2 in a plan.

Hardware Configuration of Delivery Processing Device

Figure 6A:
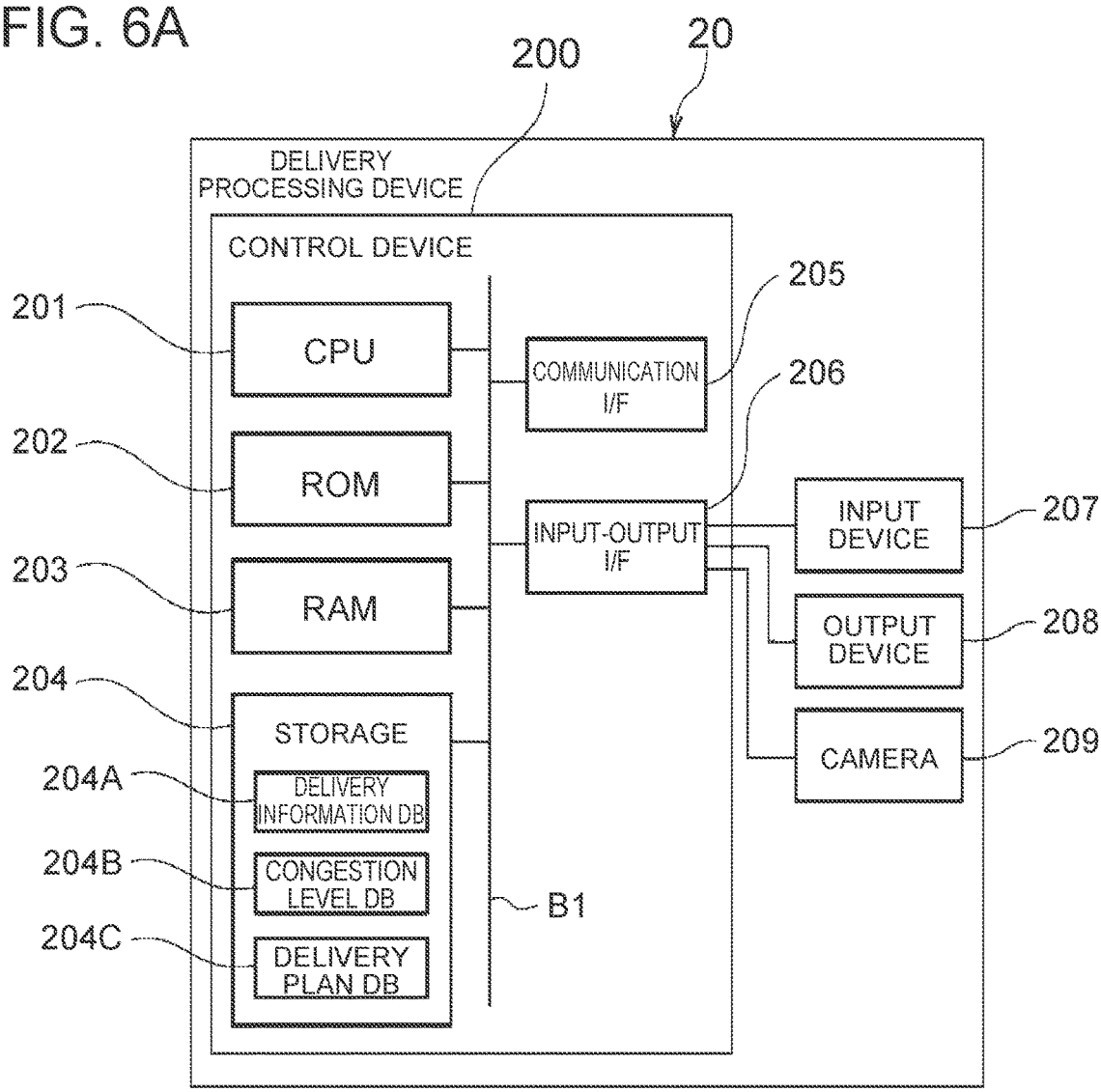
FIG. 6A is a block diagram showing the hardware configuration of a delivery processing device.

FIG. 6A is a block diagram showing the hardware configuration of the delivery processing device 20. The delivery processing device 20 includes a control device 200. The control device 200 is configured to include a central processing unit (CPU) 201, a read-only memory (ROM) 202, a random-access memory (RAM) 203, a storage 204, a communication interface (I/F) 205 and an input-output interface 206. The CPU 201, the ROM 202, the RAM 203, the communication interface 205 and the input-output interface 206 are connected so as to be capable of communicating with each other through a bus B1.

Figure 6B:
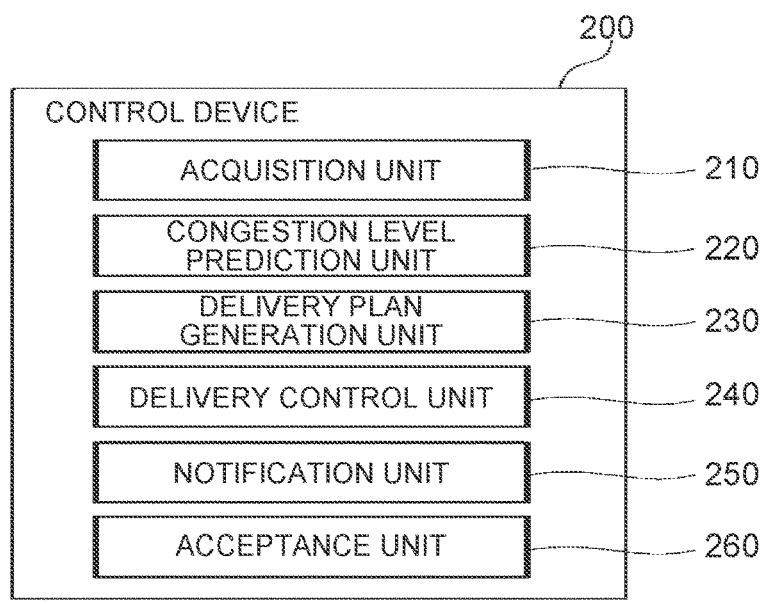
FIG. 6B is a block diagram showing an example of the functional configuration of the delivery processing device.

The CPU 201, which is a central arithmetic processing unit, executes a variety of programs, and controls a variety of units. That is, the CPU 201 reads a program from the ROM 202, and executes the program using the RAM 203 as a working area. In the embodiment, an execution program is stored in the ROM 202 or the storage 204. By executing the execution program, the CPU 201 functions as an acquisition unit 210, a congestion level prediction unit 220, a delivery plan generation unit 230, a delivery control unit 240, a notification unit 250 and an acceptance unit 260, which are shown in FIG. 6B.

In the ROM 202, a variety of programs and a variety of data are stored. The RAM 203 serves as a working area, and programs and data are temporarily stored. The storage 204 as a storing unit is constituted by a hard disk drive (HDD) or a solid state drive (SSD), and a variety of programs including an operating system and a variety of data are stored. In the embodiment, a delivery information database 204A, a congestion level database 204B and a delivery plan database 204C are stored in the storage 204.

The communication I/F 205 is an interface for communication with a control device 300 of the moving apparatus 30, the user terminal 40 and others, and, for example, standards such as Ethernet (R), FDDI and Wi-Fi (R) are used.

The input-output I/F 206 is an interface for communication with devices that are equipped in the delivery processing device 20. The control device 200 in the embodiment is connected with an input device 207, an output device 208 and a camera 209 through the input-output I/F 206.

The input device 207 includes a pointing device such as a mouse, and a keyboard, for example, and is used for a variety of inputs. The output device 208 is a liquid crystal display, for example, and displays a variety of information. The output device 208 may function as the input device 207 by employing a touch panel technique. The camera 209 includes a code reading unit that reads an identification code 50 (see FIG. 4) attached to the parcel P. The input device 207, the output device 208 and the camera 209 may be directly connected to the bus B1.

Functional Configuration of Control Device

FIG. 6B is a block diagram showing an example of the functional configuration of the control device 200. The control device 200 (CPU 201) includes the acquisition unit 210, the congestion level prediction unit 220, the delivery plan generation unit 230, the delivery control unit 240, the notification unit 250 and the acceptance unit 260. The functional constituents are realized when the CPU 201 reads the execution program stored in the ROM 202 and executes the execution program.

The acquisition unit 210 reads the identification code attached to a particular parcel P through the camera 209, and acquires delivery information about the parcel P. Further, the acquisition unit 210 stores the acquired delivery information in the delivery information database 204A, and updates the delivery information database 204A.

Figure 4:
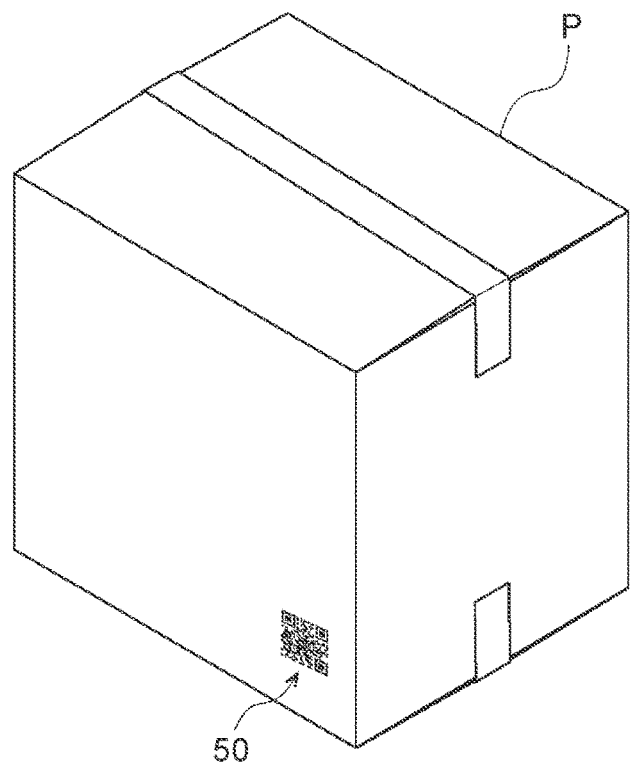
FIG. 4 is a diagram showing an example of a parcel to be delivered and an identification code attached to the parcel.

In the embodiment, as shown in FIG. 4, the identification code 50 that is a two-dimensional code is attached to the parcel P. The identification code 50 is a code indicating information specific to the parcel P, and includes a bar code, a QR code (R) or the like. For example, the identification code 50 may be attached to each parcel P in a broad-area relay spot on the delivery route of the delivery business operator, or may be attached to each parcel P in the distribution center A.

FIG. 7 shows an example of a data table of the delivery information database 204A. The delivery information includes a parcel ID, position information about the delivery destination, a scheduled shipment hour, a scheduled transfer hour, an addressee ID and the like, and in the data table, the pieces of information are stored in association with each other. The parcel ID is an ID for identifying an individual parcel P. The position information about the delivery destination is position information about the address of the addressee, and is position information indicating the position of the transfer spot D on the circulation route R1. The scheduled shipment hour is an hour at which the parcel P is scheduled to be loaded on the conveyance path R of the moving apparatus 30. The scheduled shipment hour may be an hour at which the parcel P to be delivered from the broad-area relay spot to the distribution center A is scheduled to arrive at the distribution center A. The scheduled transfer hour is an hour at which the parcel P is scheduled to be transferred to a predetermined delivery destination. The scheduled transfer hour may be a desired transfer hour that is set by the sender or addressee of the parcel P. In the case where neither the sender nor the addressee sets the desired transfer hour, it is not necessary to set the scheduled transfer hour. The scheduled transfer hour may be a transfer hour that is predicted based on the scheduled shipment hour. The addressee ID is an ID for identifying the user that is the addressee of the parcel P.

The congestion level prediction unit 220 predicts the congestion level of the conveyance path R at a predetermined hour, for each of the routes (R1 to R3), based on the delivery information stored in the delivery information database 204A. The congestion level prediction unit 220 stores information relevant to the predicted congestion level and information relevant to the congestion level of each route at the current hour, in the congestion level database 204B, and updates the congestion level database 204B.

The congestion level is the rate of a total load amount of parcels P to an acceptable load amount of the route. The acceptable load amount is an upper limit of the load amount that can be loaded on the route. The acceptable load amount is calculated based on the total number and total weight of parcels P that are loaded.

The congestion level prediction unit 220 predicts the congestion level based on information relevant to scheduled shipment hours at which parcels P scheduled to be distributed from the distribution center A are loaded on the moving apparatus and information relevant to scheduled transfer hours of the parcels P, which are information in the delivery information database 204A. From the information, the congestion level prediction unit 220 predicts the congestion level by specifying parcels P to be loaded on the route at a predetermined hour and calculating the percentage of the load amount of the parcels P to the acceptable load amount.

FIG. 8A and FIG. 8B shows examples of a data table of the congestion level database 204B. As shown in the figures, in the data table, date, hour and the congestion levels predicted for the respective routes are stored in association with each other. For example, in the data table shown in FIG. 8A as an example, predicted values of congestion levels on October 17 are stored. As can be seen from this data, it is predicted that the congestion level of the circulation route R1 in a time period of 12:00 to 15:00 will be 40%. Further, as can be seen from FIG. 8B, it is predicted that the congestion level of the circulation route R1 in a time period of 12:00 to 15:00 on December 25 will be 80%.

The delivery plan generation unit 230 generates a delivery plan for transferring the parcel P to the delivery destination, based on the delivery information about the parcel P and the predicted value of the congestion level. The delivery plan is generated by a delivery process described later. The delivery plan generation unit 230 stores the generated delivery plan in the delivery plan database 204C, and updates the delivery plan database 204C.

More specifically, the delivery plan generation unit 230 refers to the position information about the delivery destination of the parcel P in the delivery information database 204A, and specifies the branch point BP on the circulation route R1 that reaches the delivery destination. Then, the delivery plan generation unit 230 generates a plan in which advance is permitted at the specified branch point BP at the scheduled transfer hour. Further, the delivery plan generation unit 230 refers to the congestion level predicted by the congestion level prediction unit 220, and generates the delivery plan so as to avoid the congestion level from being equal to or higher than a predetermined threshold value when the parcel P is delivered. As an example, the threshold value in the embodiment is set to 70%. An example of the delivery plan will be described below with reference to FIG. 9A and FIG. 9B.

FIG. 9A and FIG. 9B show examples of a data table of the delivery plan database 204C. The data tables shown in FIG. 9A and FIG. 9B show delivery plans for parcels P that are delivered on October 17 and December 25. For both of the parcels P that are delivered in the delivery plans in FIG. 9A and FIG. 9B, the scheduled shipment hour is set to 9:00 to 12:00, and the scheduled transfer hour is set to 12:00 to 15:00.

In each data table, the date, hour, delivery state, and information relevant to whether movement direction change at the branch point BP (a delivery destination inlet, a waiting route inlet and a waiting route outlet) is permitted are stored in association with each other. The delivery state of the parcel P is shown by WAITING or TRANSFER. WAITING indicates a state where the parcel cannot be transferred to the delivery destination. TRANSFER indicates a state where the parcel can be transfer to the delivery destination. For example, in the case where the current hour is different from the scheduled transfer hour, or in the case where the addressee is absent at the delivery destination and the parcel cannot be transferred, the delivery state is the waiting state. Further, in the case where the current hour corresponds to the scheduled transfer hour, the delivery state is the transfer state.

With reference to the data table on October 17 shown in FIG. 9A, the delivery state is the waiting state because a time period of 9:00 to 12:00 is not the scheduled transfer hour. Further, the movement direction change at the branch point BP in the time period is not permitted for each branch point BP. Accordingly, it is found that the parcel P is moved in the time period while being loaded on the circulation route R1. Furthermore, the movement direction change at the branch point BP of the delivery destination inlet is permitted in a time period of 12:00 to 15:00, which is the scheduled transfer hour, and it is found that the movement direction is changed at the branch point BP of the delivery destination inlet in the time period and the parcel P is moved toward the delivery destination.

On the other hand, with reference to the data table on December 25 shown in FIG. 9B, in a time period of 9:00 to 12:00, during which the parcel is in the waiting state, the movement direction change at the branch point BP of the waiting route inlet is permitted. This is because the congestion level of the circulation route R1 in the time period on December 25 is predicted to be 80%, which is higher than 70% as the threshold value, by the congestion level prediction unit 220. It is found that the delivery plan generation unit 230 has generated a delivery plan for moving the parcel P to the waiting route R2 in the time period, in order to avoid the congestion level of the circulation route R1 from being equal to or higher than 70% in the time period. Furthermore, the movement direction changes at the branch point BP of the waiting route outlet and the branch point BP of the delivery destination inlet are permitted in a time period of 12:00 to 15:00, which is the scheduled transfer hour, and it is found that the parcel P is returned to the circulation route R1 in the time period again and is moved toward the delivery destination.

The delivery control unit 240 controls an actuator 307 that drives the conveyance path R of the moving apparatus 30. Further, the delivery control unit 240 controls the conveyance arm 309 of the moving apparatus 30, based on the delivery plan generated by the delivery plan generation unit 230. Specifically, the delivery control unit 240 generates control signals for controlling the actuator 307 and the conveyance arm 309, and sends the control signals to the moving apparatus 30 through the communication interface 205.

The notification unit 250 gives (sends) a notice of request information for requesting the permission of the transfer, to the user terminal 40 of the user that is the addressee of the parcel P. For example, the user terminal 40 is a general-purpose smartphone or tablet terminal.

The acceptance unit 260 accepts (receives) permission information that is sent from the user terminal 40 in response to the request information. The permission information is information indicating that the transfer of the parcel P to the conveyance destination is permitted.

Hardware Configuration of Moving Apparatus

Figure 10A:
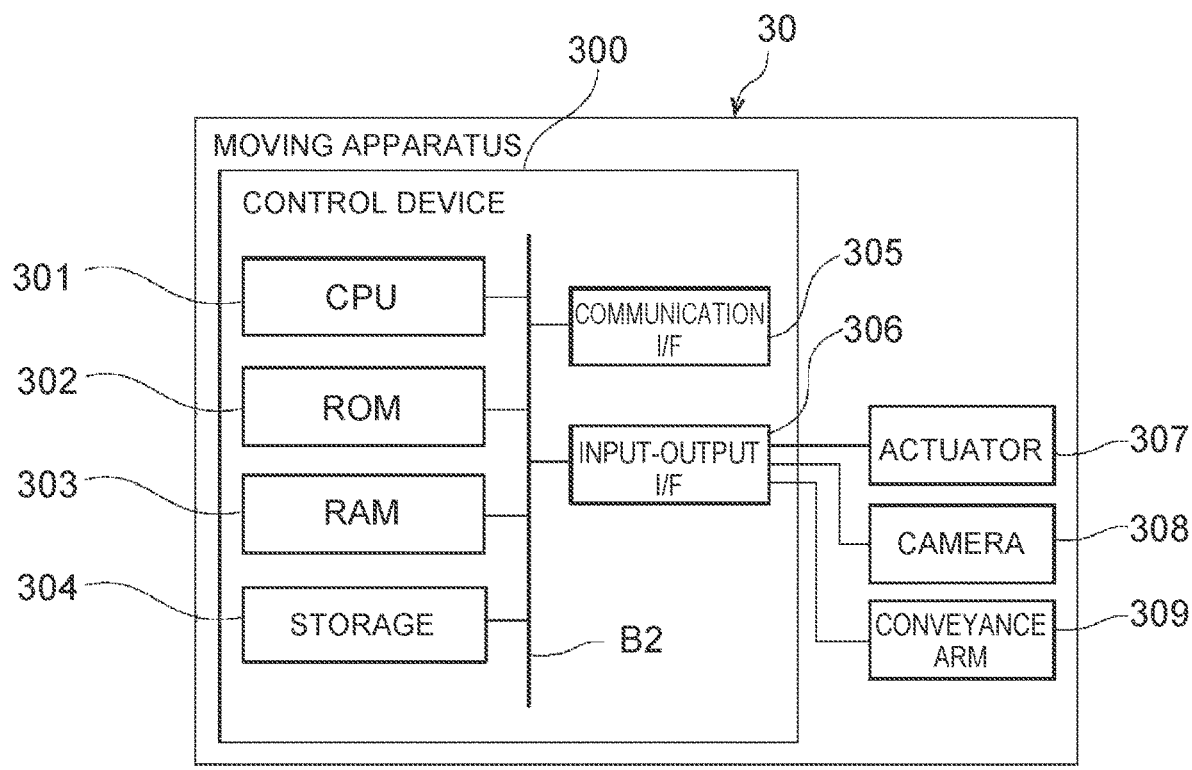
FIG. 10A is a block diagram showing the hardware configuration of a moving apparatus.

FIG. 10A is a block diagram showing the hardware configuration of the moving apparatus 30. The moving apparatus 30 includes a control device 300. The control device 300 is configured to include a CPU 301, a ROM 302, a RAM 303, a storage 304, a communication interface 305 and an input-output interface 306. The CPU 301, the ROM 302, the RAM 303, the communication interface 305 and the input-output interface 306 are connected so as to be capable of communicating with each other through a bus B2. The functions of the CPU 301, the ROM 302, the RAM 303, the storage 304, the communication interface 305 and the input-output interface 306 are the same as the functions of the CPU 201, the ROM 202, the RAM 203, the storage 204, the communication interface 205 and the input-output interface 206 of the above-described control device 200.

The CPU 301 reads a program from the ROM 302 or the storage 304, and executes the program using the RAM 303 as a working area. In the embodiment, an execution program is stored in the ROM 302. By executing the execution program, the CPU 301 functions as an acceptance unit 310 and an execution unit 320 shown in FIG. 10B.

The control device 300 is connected with the actuator 307 that drives the conveyance path R through the input-output interface 306, a plurality of cameras 308 that is disposed along the conveyance path R, and the conveyance arms 309 that are provided at the branch points BP on the circulation route R1. The actuator 307, the cameras 308 and the conveyance arms 309 are directly connected to the bus B2.

Functional Configuration of Control Device

Figure 10B:
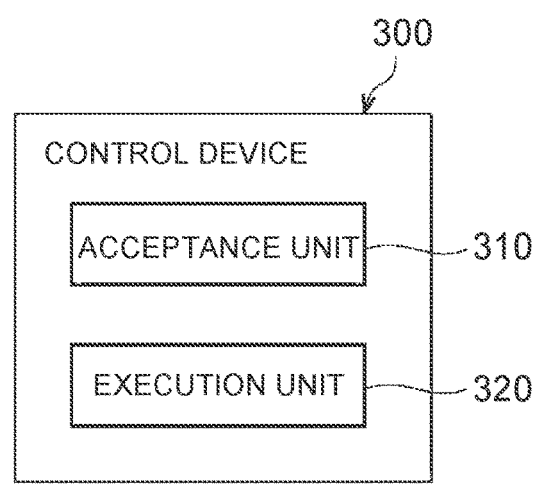
FIG. 10B is a block diagram showing an example of the functional configuration of the moving apparatus.

FIG. 10B is a block diagram showing an example of the functional configuration of the control device 300. The control device 300 (CPU 301) includes the acceptance unit 310 and the execution unit 320. The functional constituents are realized when the CPU 301 reads the execution program stored in the ROM 302 and executes the execution program.

The acceptance unit 310 accepts (receives) the control signals for the actuator 307 and the conveyance arm 309 that are sent from the delivery processing device 20.

When the acceptance unit 310 accepts the control signals, the execution unit 320 controls the actuator 307 and the conveyance arm 309 based on the control signals.

Based on an image photographed by the camera 308, the execution unit 320 analyzes the identification code 50 attached to the parcel P, and identifies the parcel P that passes through each point on the conveyance path R. For example, the camera 308, which is provided before the branch point BP, specifies the parcel P that passes in front of the camera 308, and controls the conveyance arm 309 based on the control signal accepted about the specified parcel P. In the case where the change in the movement direction of the parcel P at the branch point BP is not permitted, the conveyance arm 309 is disposed at an evacuation position so as to be evacuated from the conveyance path R. On the other hand, in the case where the change in the movement direction of the parcel P at the branch point BP is permitted, the conveyance arm 309 moves to a penetration position (see FIG. 5) so as to penetrate the conveyance path R. Then, a plate-shaped guide portion 309A provided at a distal end of the conveyance arm 309 guides the parcel P in the changed movement direction.

Action

Next, a flow of a process in the delivery system 10 in the embodiment will be described with reference to flowcharts of FIG. 11 and FIG. 12.

As shown in FIG. 2A, the parcel P to be transferred to a particular user is collected to the distribution center A.

Next, a delivery plan generation process that is performed by the delivery processing device 20 at the time of the acquisition of the delivery information from the identification code 50 attached to the parcel P in the distribution center A will be described with use of FIG. 11.

Figure 11:
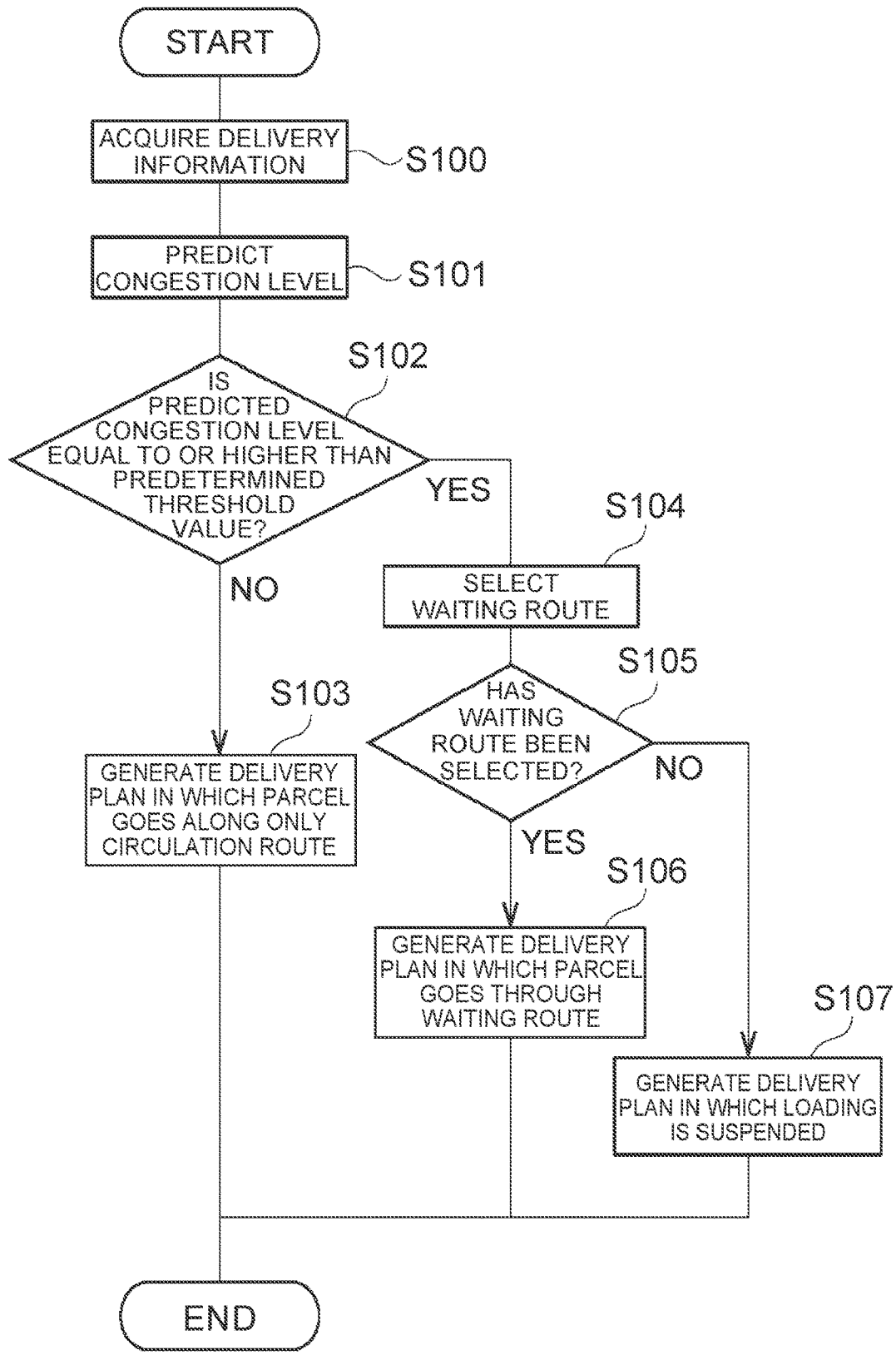
FIG. 11 is a flowchart showing an example of a flow of a delivery plan generation process for generating a delivery plan for the parcel.

In step S100 of FIG. 11, the CPU 201 acquires the delivery information about the parcel P, from the identification code 50 in the image photographed by the camera 209. After the acquisition of the delivery information, the process proceeds to the next step S101.

In step S101, the CPU 201 predicts the congestion level. The CPU 201 stores the predicted congestion level in the congestion level database 204B. After the update of the congestion level database 204B finishes, the process proceeds to the next step S102.

In step S102, the CPU 201 determines whether the predicted congestion level of the circulation route R1 is equal to or higher than the predetermined threshold value (70%). Specifically, the CPU 201 refers to the congestion level database 204B, and determines whether the predicted congestion level of the circulation route R1 from the scheduled shipment hour to the scheduled transfer hour for the parcel P is equal to or higher than 70%. When the CPU 201 determines that the predicted congestion level of the circulation route R1 is equal to or higher than the predetermined threshold value, the process proceeds to step S104. On the other hand, when the CPU 201 determines that the predicted congestion level of the circulation route R1 is lower than the predetermined threshold value, the process proceeds to step S103.

In step S103, the CPU 201 generates a delivery plan in which the parcel P goes along only the circulation route R1 until the scheduled transfer hour, and ends the process. Specifically, the CPU 201 generates a delivery plan in which the movement direction change at each branch point BP on the circulation route R1 is not permitted and the parcel P is moved along the circulation route R1 before the scheduled transfer hour for the parcel P and in which the movement direction change at the branch point BP of the delivery destination inlet is permitted and the parcel P is transferred to the delivery destination at the scheduled transfer hour.

On the other hand, in step S104, the CPU 201 selects a waiting route R2 along which the parcel P can be moved. Specifically, the CPU 201 refers to the congestion level database 204B, and in the case where there is a waiting route R2 for which the predicted congestion level from the scheduled shipment hour to the scheduled transfer hour is lower than the predetermined threshold value (70%), the CPU 201 selects that waiting route R2. For example, in the selection of the waiting route R2, the CPU 201 may preferentially select a waiting route R2 that is closest to the delivery destination.

Next, in step S105, the CPU 201 determines whether the waiting route R2 has been selected, and when the CPU 201 determines that the waiting route R2 has been selected in step S104, the process proceeds to step S106. On the other hand, when the CPU 201 determines that the waiting route R2 has not been selected, the process proceeds to step S107.

In step S106, the CPU 201 generates a delivery plan in which the parcel P goes through the selected waiting route R2, and ends the process. Specifically, the CPU 201 generates a delivery plan in which the parcel P is moved along the selected waiting route R2 from the scheduled shipment hour to the scheduled transfer hour and in which the movement direction changes at the branch point BP of the outlet of the waiting route R2 and the branch point BP of the delivery destination inlet are permitted and the parcel P is transferred to the delivery destination at the scheduled transfer hour.

In step S107, since the conveyance path R on which the parcel P can be loaded has not been selected, the CPU 201 generates a delivery plan in which the loading of the parcel P on the moving apparatus 30 is suspended, and ends the process.

Figure 2C:
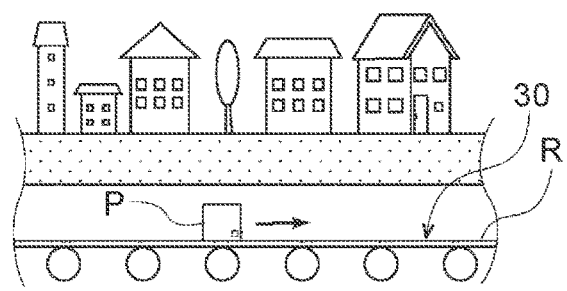
FIG. 2C is a diagram for describing the flow along which the parcel is delivered in the first embodiment.
Figure 2D:
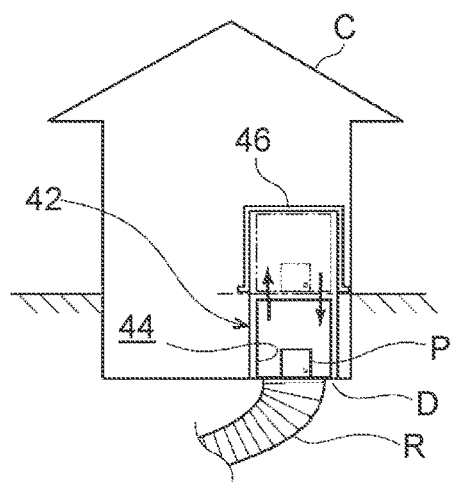
FIG. 2D is a diagram for describing the flow along which the parcel is delivered in the first embodiment.

Next, as shown in FIG. 2C, the parcel P is moved along the conveyance path R based on the generated delivery plan. On this occasion, an example of an absent transfer process that is performed by the delivery processing device 20 will be described with reference to FIG. 12.

Figure 12:
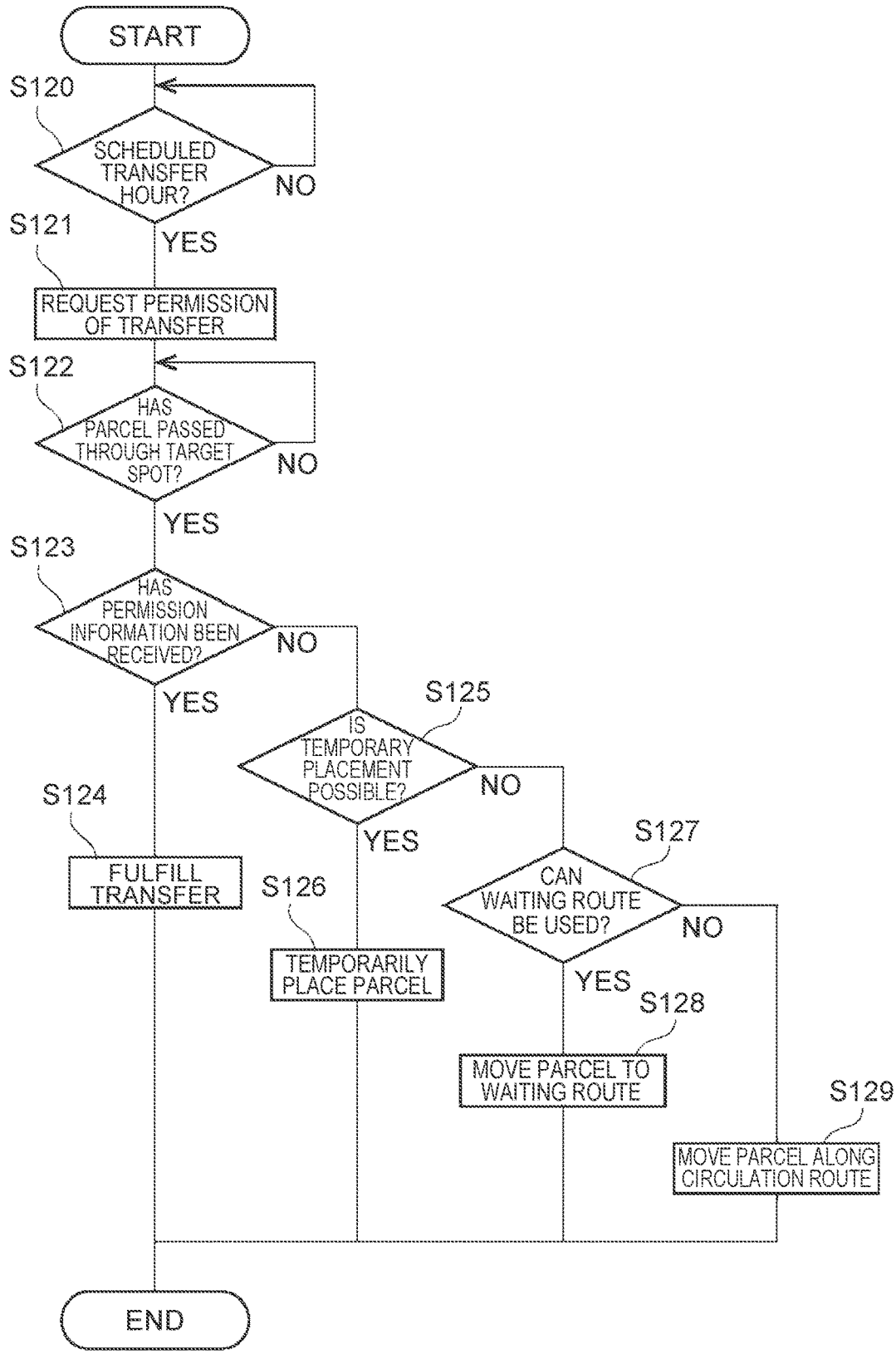
FIG. 12 is a flowchart showing an example of a flow of an absent transfer process for processing an absent transfer when an addressee is absent at a delivery destination.

In step S120 of FIG. 12, the CPU 201 determines whether the current hour is the scheduled transfer hour for the parcel P. Specifically, the CPU 201 refers to the delivery information about the parcel P loaded on the conveyance path R, and determines whether the current hour is the scheduled transfer hour. When the CPU 201 determines that the current hour is the scheduled transfer hour for the parcel P, the process proceeds to step S121. On the other hand, when the CPU 201 determines that the current hour is not the scheduled transfer hour for the parcel P, the CPU 201 repeats the process of step S120.

In step S121, the CPU 201 gives the notice of the request information for requesting the permission of the transfer, to the user terminal 40 of the user that is the addressee of the parcel P. After the notification of the request information, the process proceeds to the next step S122.

In step S122, the CPU 201 determines whether the parcel P has passed through a target spot. For example, the target spot is a spot that is on the circulation route R1 and that is positioned downstream of the delivery destination in the conveyance direction of the conveyance path R, and is a spot that is positioned a predetermined distance away from the delivery destination. Specifically, the CPU 201 specifies the parcel P that has passed in front of the camera 308, based on the image photographed by the camera 308 provided along the conveyance path R, and specifies the position of the specified parcel P from installation position information about the camera 308. Then, the CPU 201 calculates the distance between the position of the parcel P and the delivery destination, and determines whether the parcel P has passed through the target spot on the circulation route R1. When the CPU 201 determines that the parcel P has passed through the target spot, the process proceeds to step S123. On the other hand, when the CPU 201 determines that the parcel P has not passed through the target spot, the CPU 201 repeats the process of step S122.

In step S123, the CPU 201 determines whether the permission information indicating the permission of the transfer has been received from the user that is the addressee. When the CPU 201 determines that the permission information has been received, the CPU 201 fulfills the transfer in step S124, and ends the process. On the other hand, when the CPU 201 determines that the permission information has not been received, the process proceeds to step S125.

In step S125, the CPU 201 determines whether the parcel P can be temporarily placed at the transfer spot D provided underground of the delivery destination. For example, the CPU 201 determines whether a parcel placing site in the elevator apparatus 42 at the transfer spot D is empty, based on the image photographed by the camera 308 provided along the conveyance path R, and when the CPU 201 determines that the parcel placing site is empty, and the CPU 201 determines that the temporary placement is possible. Alternatively, the CPU 201 may give a notice of selection information for requesting selection of whether the temporary placement of the parcel P is permitted, to the user terminal 40, and may determines whether the temporary placement of the parcel P is possible, based on answer information that is sent from the user terminal 40 in response to the selection information. When the CPU 201 determines that the temporary placement is possible, the process proceeds to step S126. On the other hand, when the CPU 201 determines that the temporary placement is not possible, the process proceeds to step S127.

In step S126, the CPU 201 temporarily places the parcel P at the transfer spot D, and ends the process.

In step S127, the CPU 201 determines whether the waiting route R2 can be used. Specifically, the CPU 201 refers to the congestion level database 204B, and checks whether the congestion level of the waiting route R2 at the current hour is lower than the predetermined threshold value (70%). When the CPU 201 determines that there is a waiting route R2 for which the congestion level is lower than 70%, the CPU 201 determines that the waiting route R2 can be used. When there is a plurality of waiting routes R2 for which the congestion level is lower than 70%, the CPU 201 may preferentially select a waiting route R2 that is positioned downstream of the delivery destination in the delivery direction and that is closest to the delivery destination. When the CPU 201 determines that the waiting route R2 can be used, the process proceeds to step S128. On the other hand, when the CPU 201 determines that the waiting route R2 cannot be used, the process proceeds to step S129.

In step S128, the CPU 201 moves the parcel P to the waiting route R2 that can be used. Specifically, the CPU 201 alters the delivery plan for the parcel P, to permit the movement direction change at the branch point BP of the inlet of the selected waiting route R2 and move the parcel P to the waiting route R2, and ends the process.

When the permission information is received from the user terminal 40 after that, the CPU 201 may alter the delivery plan for the parcel P again, may return the parcel P to the circulation route R1, and may fulfill the transfer.

In step S129, since the waiting route R2 cannot be used, the CPU 201 does not alter the delivery plan, and moves the parcel P along the circulation route R1. Thereafter, the CPU 201 ends the process.

As described above, the embodiment includes the moving apparatus 30 on which the parcel P to be transferred to the predetermined region is loaded and that is capable of moving the parcel P along the circulation route R1 along which the moving apparatus 30 circulates in the region. The parcel P is moved to the delivery destination on the circulation route R1 by the moving apparatus 30, based on the delivery plan. When the permission information indicating that the transfer of the parcel P is permitted has been received, the moving apparatus 30 fulfills the transfer of the parcel P to the delivery destination. Accordingly, for example, when the permission information about the transfer has not been received because the addressee of the parcel P is absent, the parcel P for which the addressee is absent is moved along the circulation route R1 while being loaded on the moving apparatus 30. Thereby, it is easy to store the parcel P before the parcel is transferred to the delivery destination, and the delivery business operator does not need to repeatedly move between the distribution center A and the delivery destination, even when the addressee is absent at the delivery destination.

Further, it is possible to read the delivery information including the position information about the delivery destination, from the identification code 50 attached to the parcel P. Accordingly, for example, by previously attaching the identification code 50 to the parcel P in a central distribution station (broad-area relay spot) that controls a broad area including a plurality of predetermined regions, it is possible to transmit the delivery information between the central distribution station and the moving apparatus 30, without communication.

Further, when the permission information about the transfer has not been received because the addressee of the parcel P is absent, it is possible to move the parcel for which the addressee is absent, to the temporary placement site provided at the delivery destination. Furthermore, it is possible to move the parcel P for which the addressee is absent, along the waiting route R2 branching from the circulation route R1. Accordingly, it is possible to reduce a situation where the amount of the parcels on the moving apparatus is close to the acceptable load amount because the parcel P for which the addressee is absent is moved while being loaded on the moving apparatus.

Further, in the embodiment, it is possible to deliver the parcel P while maintaining the state where the congestion level of the circulation route R1 is lower than the predetermined threshold value. Thereby, even when a large number of parcels is delivered in a busy period of the delivery business operator or the like, it is possible to efficiently deliver the parcels P while avoiding the situation where the amount of the parcels P on the moving apparatus 30 is close to the acceptable load amount.

Further, since the conveyance path R of the moving apparatus 30 is provided underground, it is possible to build a delivery network without being subject to restrictions of ground facilities. Further, for example, when the permission information for the transfer has been received from the addressee of the parcel P, it is possible to smoothly receive the parcel P by transferring the parcel P from the underground conveyance path R to the aboveground home delivery box 46 using the elevator apparatus 42.

Second Embodiment

Figure 13:
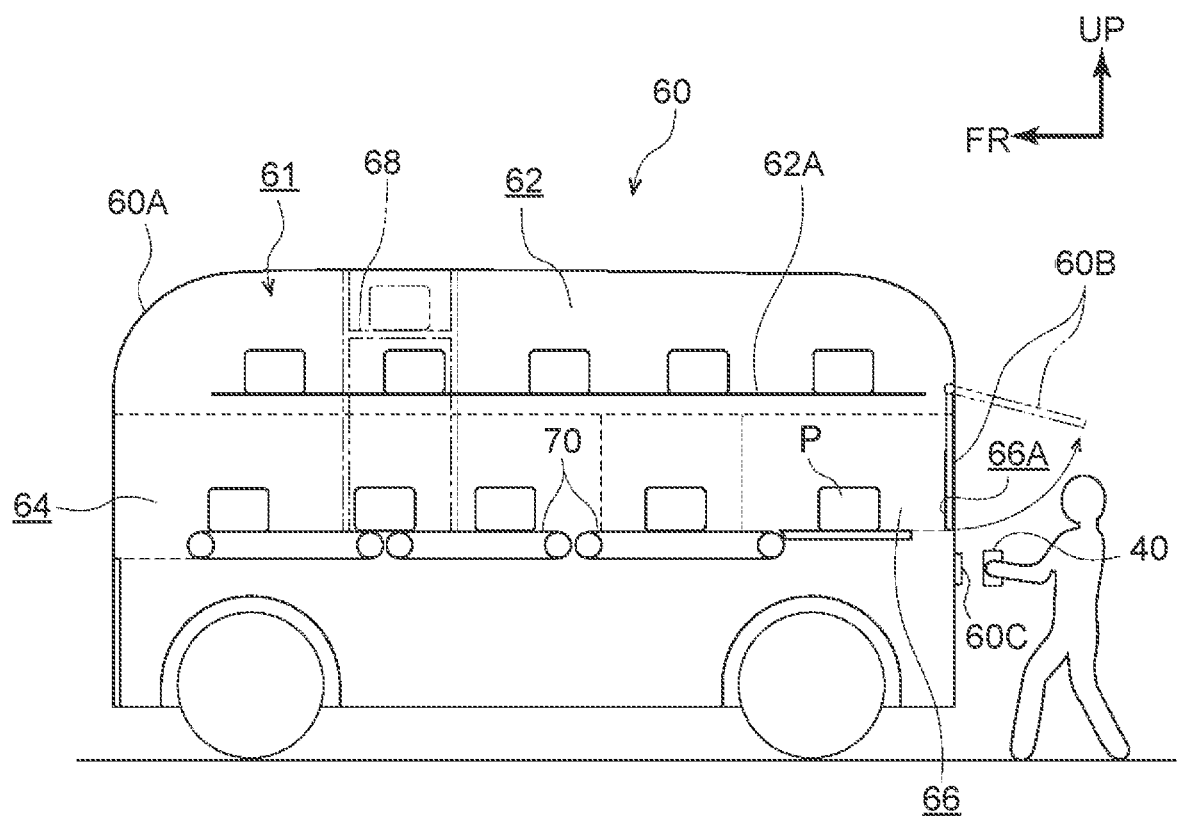
FIG. 13 is a schematic diagram of an automatic driving vehicle that is a moving apparatus in a second embodiment.

In the first embodiment, the moving apparatus 30 that delivers the parcel is constituted by the belt conveyer apparatus. In a delivery system according to a second embodiment, as shown in FIG. 13, a moving apparatus 60 is constituted by an automatic driving vehicle that can automatically travel along a circulation route R1 set to a road. Differences from the first embodiment will be described below. The same constituents as those in the first embodiment are denoted by the same reference characters, and descriptions of the constituents are omitted.

Figure 14A:
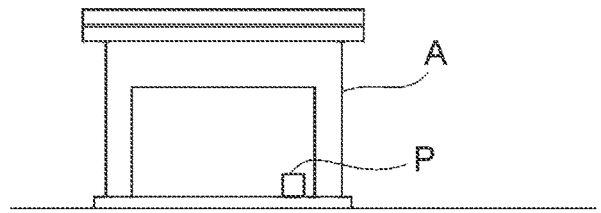
FIG. 14A is a diagram for describing a flow along which the parcel is delivered in the second embodiment.
Figure 14B:
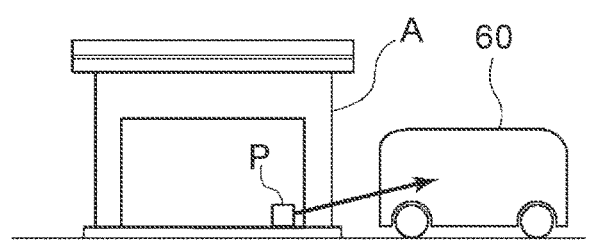
FIG. 14B is a diagram for describing the flow along which the parcel is delivered in the second embodiment.
Figure 14C:
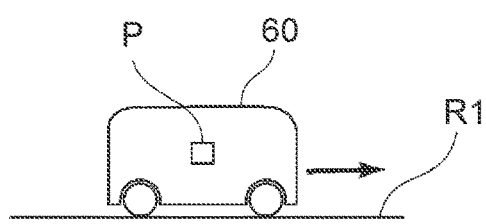
FIG. 14C is a diagram for describing the flow along which the parcel is delivered in the second embodiment.
Figure 14D:
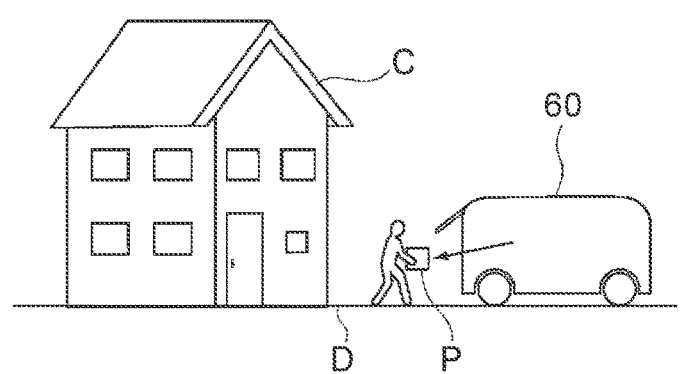
FIG. 14D is a diagram for describing the flow along which the parcel is delivered in the second embodiment.

As shown in FIG. 14A to FIG. 14D, in the delivery system according to the second embodiment, the parcel P is collected to the distribution center A via the broad-area distribution spot of the delivery business operator (see FIG. 14A). The parcel P is loaded on the moving apparatus 60 by the worker of the distribution center A (see FIG. 14B), and is moved along the circulation route R1 toward the delivery destination (see FIG. 14C). Then, the moving apparatus 60 can move to a transfer spot D near the home C that is the delivery destination, and can hand over the parcel P to the user (see FIG. 14D).

Moving Apparatus

FIG. 13 is a side sectional view showing the structure of the moving apparatus 60 in the embodiment. The moving apparatus 60 includes a roughly box-shaped vehicle body 60A that includes a cabin 61 having three stages in the vehicle-height direction. In the upper stage of the cabin 61, a parcel room 62 that contains a plurality of parcels P is provided. Further, on a vehicle front side of the middle stage of the cabin 61, a sorting room 64 for sorting the parcels P is provided, and on a vehicle rear side, a handover room 66 for handing over a parcel P to the user is provided.

A hinge door 60B is provided at a door opening portion 66A on the vehicle rear side of the handover room 66. The hinge door 60B is supported at a vehicle upper end portion such that a vehicle lower side can pivot. In the embodiment, when the hinge door 60B is opened, the user can receive the parcel P from the handover room 66 through the door opening portion 66A. Further, a code reading unit 60C is provided at the vicinity of the door opening portion 66A. The code reading unit 60C reads an authentication code of the user that is presented from the user terminal 40.

A passage (not illustrated) extending in the vehicle front-rear direction and the vehicle-height direction is provided at the center of the parcel room 62 in the vehicle-width direction, and a rack 62A on which the parcel P is placed is provided on both sides of the passage in the vehicle-width direction. Further, a stacker crane 68 is provided on the passage. The stacker crane 68 moves the parcel P in the parcel room 62 upward, downward, forward and rearward, and moves the parcel P to the sorting room 64. Further, a conveyor 70 for moving the parcel P forward and rearward is provided on a floor portion in a range from the sorting room 64 to the handover room 66.

In the embodiment, when a particular parcel P is handed over to the user, first, the authentication code is read by the code reading unit 60C provided on the moving apparatus 60, and the user having come for receiving the parcel P and the parcel P to be handed over to the user are specified. Then, in the parcel room 62, the parcel P is placed on the conveyor 70 in the sorting room 64 from the rack 62A by the stacker crane 68. In the sorting room 64, one parcel P of a plurality of parcels P is moved to the handover room 66 by the conveyor 70. When the parcel P is moved to the handover room 66, the moving apparatus 60 opens the hinge door 60B, and hands over the parcel P to the user.

Hardware Configuration of Automatic Driving Vehicle

Figure 15A:
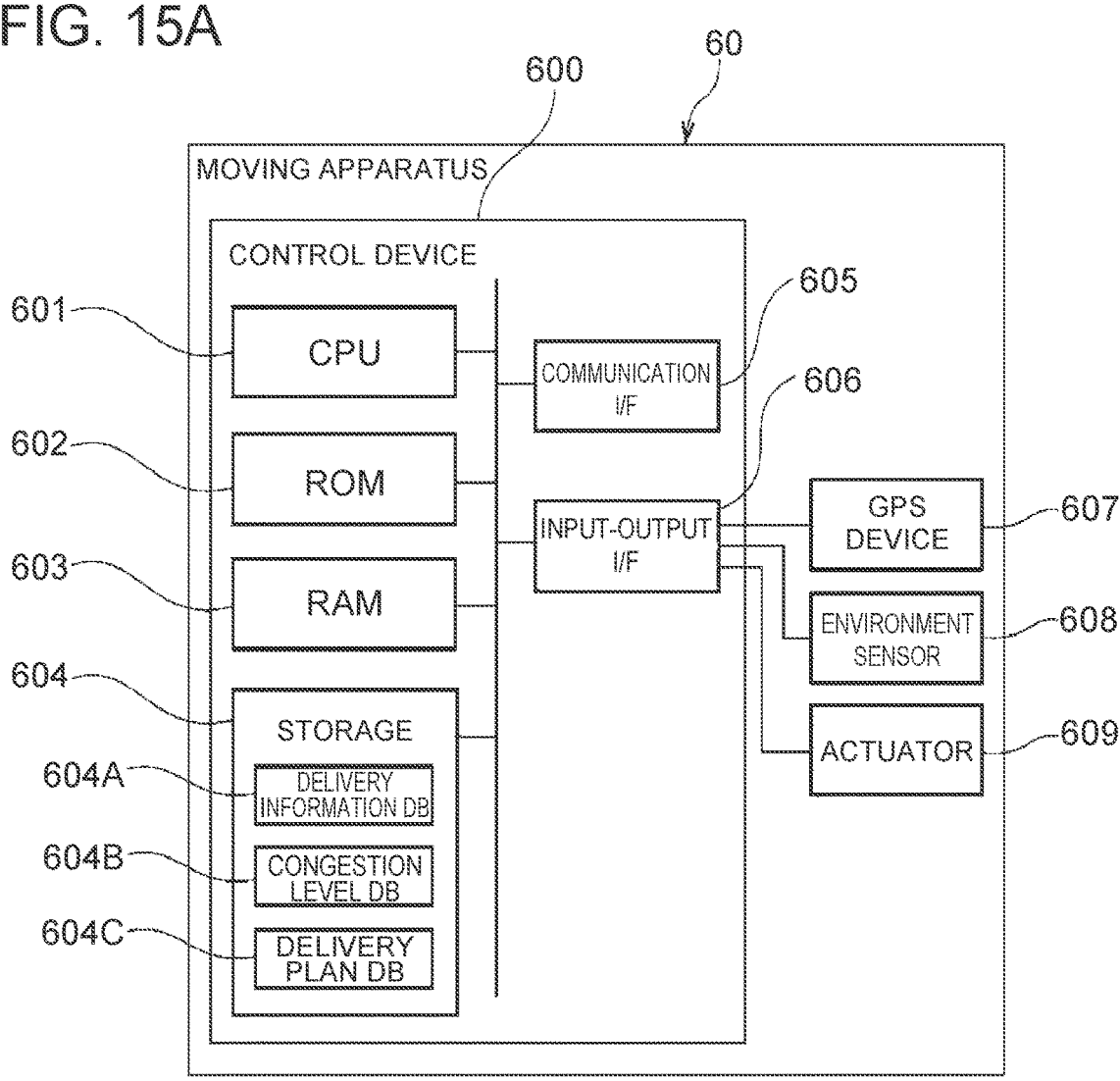
FIG. 15A is a block diagram showing the hardware configuration of the automatic driving vehicle.

FIG. 15A is a block diagram showing the hardware configuration of devices that are equipped in the moving apparatus 60 in the embodiment. The moving apparatus 60 includes a control device 600. The control device 600 is configured to include a CPU 601, a ROM 602, a RAM 603, a storage 604, a communication interface 605 and an input-output interface 606. The CPU 601, the ROM 602, the RAM 603, the communication interface 605 and the input-output interface 606 are connected so as to be capable of communicating with each other through a bus B3. The functions of the CPU 601, the ROM 602, the RAM 603, the storage 604, the communication interface 605 and the input-output interface 606 are the same as the functions of the CPU 201, the ROM 202, the RAM 203, the storage 204, the communication interface 205 and the input-output interface 206 of the above-described control device 200.

Figure 15B:
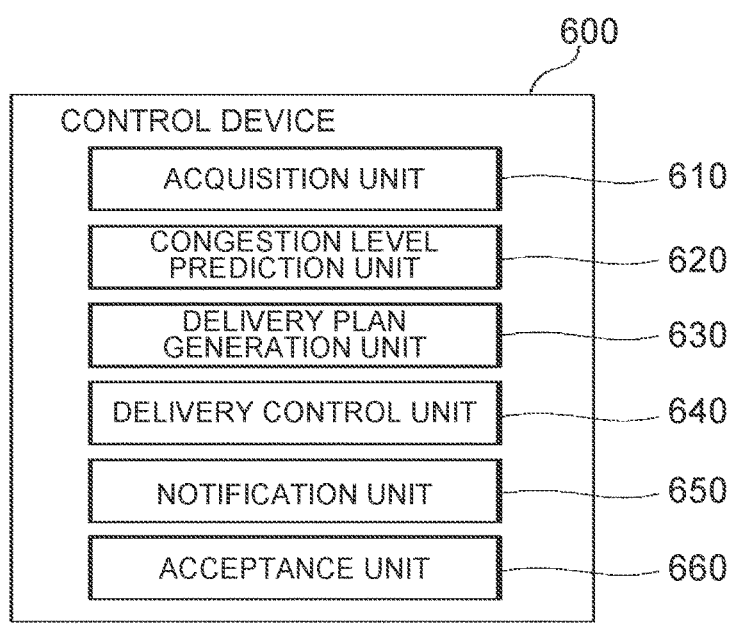
FIG. 15B is a block diagram showing an example of the functional configuration of the automatic driving vehicle.

The CPU 601 reads a program from the ROM 602 or the storage 604, and executes the program using the RAM 603 as a working area. In the embodiment, an execution program is stored in the ROM 602. By executing the execution program, the CPU 601 functions as an acquisition unit 610, a congestion level prediction unit 620, a delivery plan generation unit 630, a delivery control unit 640, a notification unit 650 and an acceptance unit 660, which are shown in FIG. 15B.

In the embodiment, a delivery information database 604A, a congestion level database 604B and a delivery plan database 604C are stored in the storage 604. However, the databases may be acquired from an external server through the communication interface 605.

The control device 600 includes a GPS device 607 that acquires the current position of the moving apparatus 60 through the input-output interface 606, an environment sensor 608 that recognizes the environment in the periphery of the moving apparatus 60, and an actuator 609 that performs the acceleration or deceleration and steering of the moving apparatus 60. The environment sensor 608 is configured to include a camera that picks up a predetermined range, a millimeter-wave radar that sends prove waves in a predetermined range, and a light detection and ranging/laser imaging detection and ranging (LIDAR) that scans a predetermined range.

Functional Configuration of Control Device

FIG. 15B is a block diagram showing an example of the functional configuration of the CPU 601. The CPU 601 includes the acquisition unit 610, the congestion level prediction unit 620, the delivery plan generation unit 630, the delivery control unit 640, the notification unit 650 and the acceptance unit 660. The functional constituents are realized when the CPU 601 reads the execution program stored in the ROM 602 and executes the execution program.

In the embodiment, the congestion level prediction unit 620 acquires traffic information about the circulation route R1 and a waiting route branching from the circulation route R1, and predicts the congestion level of the conveyance path (traveling path) from the scheduled shipment hour to the scheduled transfer hour, based on the traffic information. The congestion level is the degree of the traffic volume of the conveyance path, and is predicted with respect to a traffic volume when traffic congestion occurs.

The configurations of the acquisition unit 610, the delivery plan generation unit 630, the delivery control unit 640, the notification unit 650 and the acceptance unit 660 are the same as those in the first embodiment, and therefore detailed descriptions are omitted.

Even in the second embodiment, it is possible to exert the same operations and effects as those in the delivery system 10 according to the first embodiment. Further, in the delivery system according the second embodiment, the moving apparatus 60 performs the processes that are executed by the moving apparatus 30 in the first embodiment.

Supplement

In the first embodiment, the conveyance path R is provided underground. However, the disclosure is not limited to this, and the conveyance path R may be provided aboveground. In the second embodiment, some functional constituents of the functional constituents, for example, the functional constituents other than the delivery control unit 640 may be executed by an external device.

A variety of processes that are executed by the CPUs 201, 301, 601 after the reading of software (programs) in the above embodiments may be executed by a variety of processors other than the CPUs. In this case, examples of the processors include a programmable logic device (PLD) such as a field-programmable gate array (FPGA), in which the circuit configuration can be changed after the production, and a dedicated electric circuit such as an application specific integrated circuit (ASIC), which is a processor having a circuit configuration specially designed for a particular process. Further, a position analysis process, a preference analysis process, an image extraction process and an image display process may be executed by one of the variety of processors, or may be executed by a combination of two or more processors of the same kind or different kinds (for example, a combination of a plurality of FPGAs, or a combination of a CPU and an FPGA). More specifically, the hardware structure of the variety of processors is an electric circuit in which circuit elements such as semiconductor elements are combined.

In the above embodiments, the programs for the delivery plan generation process and the absent transfer process are previously stored (installed) in the ROM or the storage, but the disclosure is not limited to this. The programs may be provided while being recorded in a recording medium such as a compact disc read-only memory (CD-ROM), a digital versatile disc read-only memory (DVD-ROM) and a universal serial bus (USB) memory. Further, the programs may be downloaded from an external device through a network.

The flows of the processes described in the above embodiments are examples. Without departing from the spirit, unnecessary steps may be removed, other steps may be added, or processing orders may be changed.

What is claimed is:

1. A delivery system comprising:
a belt conveyor apparatus in which a conveyance path is formed along a circulation route; and
a processor, wherein;
the belt conveyor apparatus is configured to have a parcel loaded and to be capable of moving the parcel along the circulation route, the parcel being transferred to a predetermined region, the circulation route being a route along which the belt conveyor apparatus circulates in the predetermined region,
the belt conveyor apparatus is provided underground, and the processor is configured to:
be capable of acquiring delivery information including position information about a delivery destination of the parcel,
be capable of generating a delivery plan based on the acquired delivery information, the delivery plan being a plan for delivering the parcel to the delivery destination,
control the belt conveyor apparatus such that the belt conveyor apparatus moves the parcel to the delivery destination on the circulation route based on the delivery plan and fulfills the transfer of the parcel when permission information has been received, the permission information indicating that the transfer of the parcel is permitted, and
when the permission information has been received while the belt conveyor apparatus is moving the parcel to the delivery destination, control the belt conveyor apparatus such that the belt conveyor apparatus moves the parcel to the delivery destination, puts the parcel in an elevator apparatus underground of the delivery destination, and transfers the parcel to a home delivery box provided on an aboveground floor, using the elevator apparatus.

2. The delivery system according to claim 1, wherein the processor is configured to be capable of acquiring the delivery information by reading an identification code attached to the parcel.

3. The delivery system according to claim 1, wherein when the permission information has not been received while the belt conveyor apparatus is moving the parcel to the delivery destination, the processor controls the belt conveyor apparatus such that the belt conveyor apparatus moves the parcel to the delivery destination and temporarily places the parcel at a temporary placement site provided at the delivery destination.

4. The delivery system according to claim 1, wherein when the permission information has not been received while the belt conveyor apparatus is moving the parcel to the delivery destination, the processor controls the belt conveyor apparatus such that the belt conveyor apparatus moves the parcel along a waiting route branching from the circulation route.

5. The delivery system according to claim 1, wherein the processor is further configured to:
   predict a congestion level of the circulation route at a predetermined hour based on the delivery information, and
   be capable of generating the delivery plan so as to avoid the congestion level from being equal to or higher than a predetermined threshold value, based on the predicted congestion level.

6. The delivery system according to claim 1, wherein the belt conveyor apparatus is constituted by an automatic driving vehicle capable of automatically traveling along the circulation route.

7. A delivery method for transferring a parcel to a delivery destination using a belt conveyor apparatus in which a conveyance path is formed along a circulation route, the belt conveyor apparatus being configured to have the parcel loaded and to be capable of moving the parcel along the circulation route, the parcel being transferred to a predetermined region, the circulation route being a route along which the belt conveyor apparatus moves in the predetermined region, wherein the belt conveyor apparatus is provided underground, the delivery method comprising:
   acquiring delivery information including position information about the delivery destination of the parcel;
   generating a delivery plan based on the acquired delivery information, the delivery plan being a plan for delivering the parcel to the delivery destination;
   controlling the belt conveyor apparatus such that the belt conveyor apparatus moves the parcel to the delivery destination on the circulation route based on the delivery plan and fulfills the delivery of the parcel when permission information has been received, the permission information indicating that the transfer of the parcel is permitted; and
   when the permission information has been received while the belt conveyor apparatus is moving the parcel to the delivery destination, controlling the belt conveyor apparatus such that the belt conveyor apparatus moves the parcel to the delivery destination, puts the parcel in an elevator apparatus underground of the delivery destination, and transfers the parcel to a home delivery box provided on an aboveground floor, using the elevator apparatus.

8. A non-transitory computer readable medium containing a program that, upon execution by a processor, causes a computer to execute a process for transferring a parcel to a delivery destination using a belt conveyor apparatus in which a conveyance path is formed along a circulation route, the belt conveyor apparatus being configured to have the parcel loaded and to be capable of moving the parcel along the circulation route, the parcel being transferred to a predetermined region, the circulation route being a route along which the belt conveyor apparatus moves in the predetermined region, the process comprising:
   acquiring delivery information including position information about the delivery destination of the parcel;
   generating a delivery plan based on the acquired delivery information, the delivery plan being a plan for delivering the parcel to the delivery destination;
   controlling the belt conveyor apparatus such that the belt conveyor apparatus moves the parcel to the delivery destination on the circulation route based on the delivery plan and fulfills the delivery of the parcel when permission information has been received, the permission information indicating that the transfer of the parcel is permitted; and
   when the permission information has been received while the belt conveyor apparatus is moving the parcel to the delivery destination, controlling the belt conveyor apparatus such that the belt conveyor apparatus moves the parcel to the delivery destination, puts the parcel in an elevator apparatus underground of the delivery destination, and transfers the parcel to a home delivery box provided on an aboveground floor, using the elevator apparatus.

* * * * *